H. F. MAGUIRE.
TESTING DEVICE FOR IGNITION SYSTEMS.
APPLICATION FILED DEC. 16, 1919.
1,380,228.
Patented May 31, 1921.
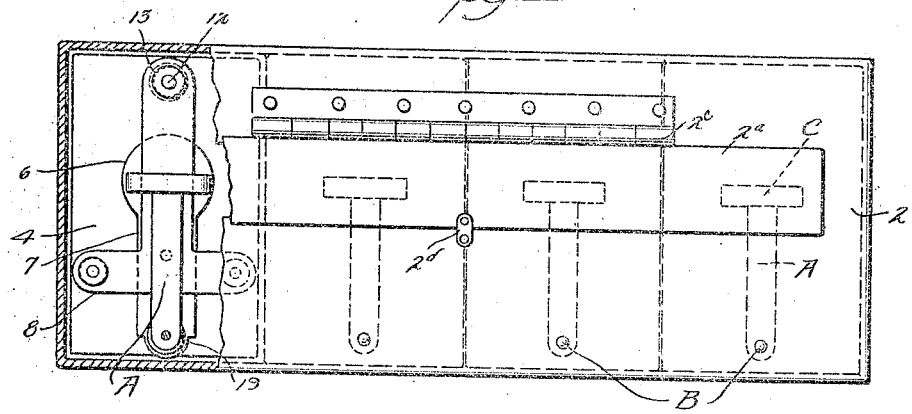
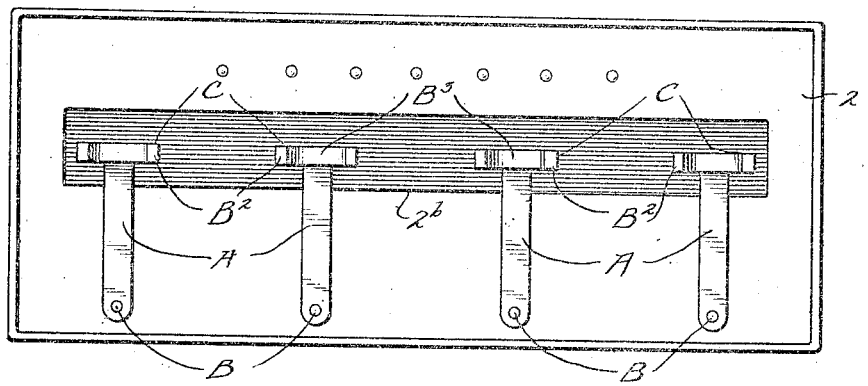
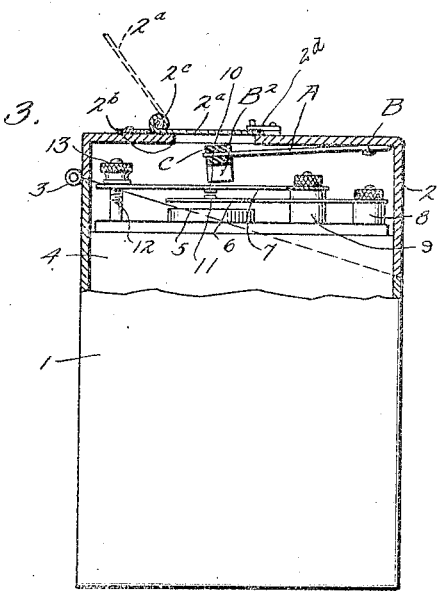
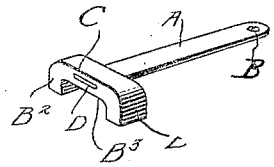
WITNESSES
INVENTOR
HUGH F. MAGUIRE
BY
ATTORNEYS

UNITED STATES PATENT OFFICE.

HUGH F. MAGUIRE, OF NEW YORK, N. Y.

TESTING DEVICE FOR IGNITION SYSTEMS.

1,380,228.   Specification of Letters Patent.   Patented May 31, 1921.

Application filed December 16, 1919. Serial No. 345,290.

*To all whom it may concern:*

Be it known that I, HUGH F. MAGUIRE, a citizen of the United States, and a resident of New York, borough of Manhattan, in the county and State of New York, have invented a new and useful Improvement in Testing Devices for Ignition Systems, of which the following is a full, clear, and exact description.

The present invention relates to a testing device for ignition systems and has reference more particular to a testing device for jump spark ignition systems which are commonly used for the firing of the explosive charge of internal combustion engines for motor vehicles.

In its preferred form this invention is especially applicable to an ignition system which employs a series of spark coils, one of which being provided for each cylinder of the engine. As an example of this form of ignition system attention is called to those motor vehicles known to the trade as Fords, and in which the spark coils are arranged side by side in a box which is usually supported on the dash of the vehicle, with the lead wires connected to the terminals of the box which are in circuit with the coils, and with the spark plugs, commutator, magneto contact, etc.

The coils used embody suitable winding and vibrator points, etc., all of which is inclosed in the box, but with the cover of the box made removable so that access may be had to the coils when occasion demands. It so happens in this ignition system, as well as in other forms, that for reasons which can not be ascertained without testing for the trouble the proper spark will fail to be produced at the gap between the electrode points of the spark plug in one or more of the cylinders of the engine. When this condition is experienced it is sometimes difficult to locate offhand just what spark plug is at fault, or if the trouble is really in the spark plug, as it may well be that some other part of the system is at fault.

A most convenient way of testing out to locate the trouble particularly in ascertaining if any one of the spark plugs are at fault, is to singularly or collectively short circuit the spark coils, and in this way locate the cylinder or cylinders which are not working. As heretofore practised to short circuit the coils the cover of the coil box must be removed to expose the vibrators so that the points thereof may be held closed or spaced apart by the fingers. Aside from the inconvenience occasioned by the removal of the cover and its replacement, there is always the expectations of a shock being experienced as the person's fingers are in contact with the noninsulated vibrators.

The present invention has for its object to arrange the box with means which is preferably a permanent fixture thereon, and adapted to normally assume an inactive position, but capable of being moved to active position to short circuit the coils either collectively or selectively.

A further object is to so arrange this means that it may be manipulated without necessitating the removal of the box cover, thus offering a further convenience.

With these and further objects in view an illustrative example of the invention is illustrated in the accompanying drawing and will now be referred to in describing one manner of reducing the invention to practice. In said drawing—

Figure 1 is a top plan view partly in section of a coil box with the coils contained therein and illustrating the application of the invention.

Fig. 2 is a plan view of the underside of the cover of the coil box illustrating the application of the invention.

Fig. 3 is an end view in section of a coil box illustrating the application of the invention, and Fig. 4 is a detailed perspective view of the means for short circuiting the coils.

One of the important features of the invention resides in so arranging the means for realizing the advantages of the invention that its utility will find expression in an association of parts which may be embodied in a conventional type of coil box without departing from the original construction thereof in so far as concerns the installation of the box and the coils contained therein. Accordingly the coil box 1 represents a substantially long housing having a cover 2 which may be hinged at the back of the box at 3, so as to completely inclose the coils 4 which are usually four in number, or one for each cylinder of the engine which is equipped with the ignition system. The coils 4 are provided with a core 5 and with the vibrator 6 and adjustment lever 7 which are supported by the posts 8 and 9 and presented over the core 5 with the points 10 and 11 mounted in confronting relation, and with the adjustment lever 7 supported at its opposite end by a threaded post 12 which is made to receive the adjusting nut 13.

As heretofore practised, to enable access to be had to the coils 4 the cover 2 of the box 1 must be removed, and with the cover removed the accepted manner of breaking the circuit to the coils in making a test out is to press down with the fingers on the vibrator 6 so as to maintain the contact points 10 and 11 open with the points spaced apart. For the reasons above stated this method is inadequate and undesirable, therefore as a practical solution of the problem it is proposed and in so far as concerns the preferred embodiment of the invention, to equip the cover 2 with a series of fingers A, one for each of the coils contained in the box, and with the same supported on the underside of the cover at points coinciding to the position of the vibrators of the coils. These fingers comprise relatively short narrow strips of spring metal which are anchored at one end as at B preferably by rivets to the cover and with their opposite ends made to support buttons or blocks C which are constructed preferably of some insulating material. The manner of mounting these buttons or blocks to the strips may be realized in any convenient manner such for instance as slotting the buttons with the slots made to receive the ends of the strips, best shown at D in Fig. 4.

As stated the strips A are of spring metal and normally they are made to assume an inactive position out of contact with the vibrator 6. When it is desired to test the coils any combination of the buttons C will be pressed downwardly until their depending extremities $B^2$ engage the vibrator 6, the space $B^3$ between said extremities spanning the adjustment lever 7. This will effect a contact of the vibrator 6 with the core 5 and separation of the contact points 10 and 11 rendering the function of said coils inactive. As soon as the pressure is removed from the buttons or blocks the spring tension of the strips will return the same to normal inactive position thus permitting the vibrators to function which they will do if the adjustment is proper.

Another feature of the invention resides in constructing the cover 2 with the supplemental cover $2^a$ which is arranged at the top of the cover to establish a relatively long narrow opening $2^b$ therein, in a position to expose all of the buttons or blocks C. This supplemental cover $2^a$ is hinged as at $2^c$ so that the cover may be swung backwardly to the position as shown in dotted lines in Fig. 3. Normally the same would cover the opening $2^b$ and a catch $2^d$ is used to hold the same closed.

From the above it will be seen that to make a test it will only be necessary to raise the cover $2^a$ to expose the buttons, whereupon they may be selectively or collectively manipulated as aforementioned; whereas, as heretofore practised the cover 2 would have had to be removed and the coils short circuited by the persons fingers, which is an inconvenience and disadvantage for the reasons stated.

Having thus described my invention what I claim as new and desire to secure by Letters Patent is as follows:

1. In a coil box, the combination of means carried thereby adapted to normally assume an inactive position and capable of engagement with the vibrator of the coil to render the same inactive, said means being arranged in a coil box to coincide with the position of the coil or coils contained therein, and in which the coil box is provided with a cover adapted to assume a normally closed position but capable of being opened to expose said means.

2. In a coil box having a cover adapted to contain a plurality of spark coils therein, a supplemental cover on the coil box cover adapted to establish an opening over the coils contained in the box, means on the first named cover supported over the vibrator coils, and exposed through said opening established by the supplemental cover for selectively or collectively engaging the vibrators of the coils, and render the same inactive.

3. In a coil box adapted to contain one or a number of induction coils and a cover therefor, the combination therewith of means adapted to normally assume an inactive position and capable of engagement with the vibrators of the coils to render the same inactive, said means being arranged to coincide with the coils contained therein, and means on the cover for permitting of the manipulation of the first means without opening the cover.

4. In a coil box adapted to contain one or a number of induction coils and a cover therefor, the combination therewith of means adapted to co-act with the vibrator of each coil for rendering the same inactive, said means normally assuming an inactive position and arranged to coincide with the coils contained therein, and means on the cover for permitting of the manipulation of said means without opening the cover.

HUGH F. MAGUIRE.